United States Patent
Kuster et al.

(10) Patent No.: US 10,260,716 B2
(45) Date of Patent: Apr. 16, 2019

(54) ILLUMINATION UNIT FOR MEDICAL DEVICES, AND ENERGY SUPPLY UNIT FOR SUPPLYING THE ILLUMINATION UNIT WITH ELECTRICAL ENERGY

(71) Applicant: Leica Instruments (Singapore) Pte. Ltd., Singapore (SG)

(72) Inventors: Manfred Kuster, Widnau (CH); Marco Schutz, Rorschach (CH); Ralf Körber, Zurich (CH)

(73) Assignee: Leica Instruments (Singapore) Pte. Ltd., Singapore (SG)

( * ) Notice: Subject to any disclaimer, the term of this patent is extended or adjusted under 35 U.S.C. 154(b) by 337 days.

(21) Appl. No.: 15/118,069

(22) PCT Filed: Feb. 11, 2015

(86) PCT No.: PCT/SG2015/000039
§ 371 (c)(1),
(2) Date: Aug. 10, 2016

(87) PCT Pub. No.: WO2015/122841
PCT Pub. Date: Aug. 20, 2015

(65) Prior Publication Data
US 2016/0363299 A1    Dec. 15, 2016

(30) Foreign Application Priority Data
Feb. 11, 2014  (DE) .................. 10 2014 101 673

(51) Int. Cl.
*F21V 23/02* (2006.01)
*F21V 23/04* (2006.01)
(Continued)

(52) U.S. Cl.
CPC ............. *F21V 19/04* (2013.01); *F21V 5/02* (2013.01); *F21V 7/0008* (2013.01); *F21V 14/04* (2013.01);
(Continued)

(58) Field of Classification Search
CPC ...................................................... F21V 14/04
See application file for complete search history.

(56) References Cited

U.S. PATENT DOCUMENTS 4,338,006 A * 7/1982 Ozeki ................. G03B 21/132
                                                        353/102
4,975,810 A   12/1990 Vanderbel
(Continued)

FOREIGN PATENT DOCUMENTS

| CN | 101964540 | 2/2011 |
| DE | 4104609 | 8/1992 |
(Continued)

*Primary Examiner* — Alexander K Garlen
(74) *Attorney, Agent, or Firm* — Hodgson Russ LLP

(57) ABSTRACT

The invention relates to an illumination unit that encompasses two light sources arranged one behind another in a channel. A cooling unit is provided respectively at the two ends of the channel. The invention further relates to an energy supply unit for supplying the illumination unit with electrical energy. The energy supply unit encompasses two energy sources arranged in a channel. Respective cooling units are arranged at the two ends of the channel.

3 Claims, 3 Drawing Sheets

Figure 4:
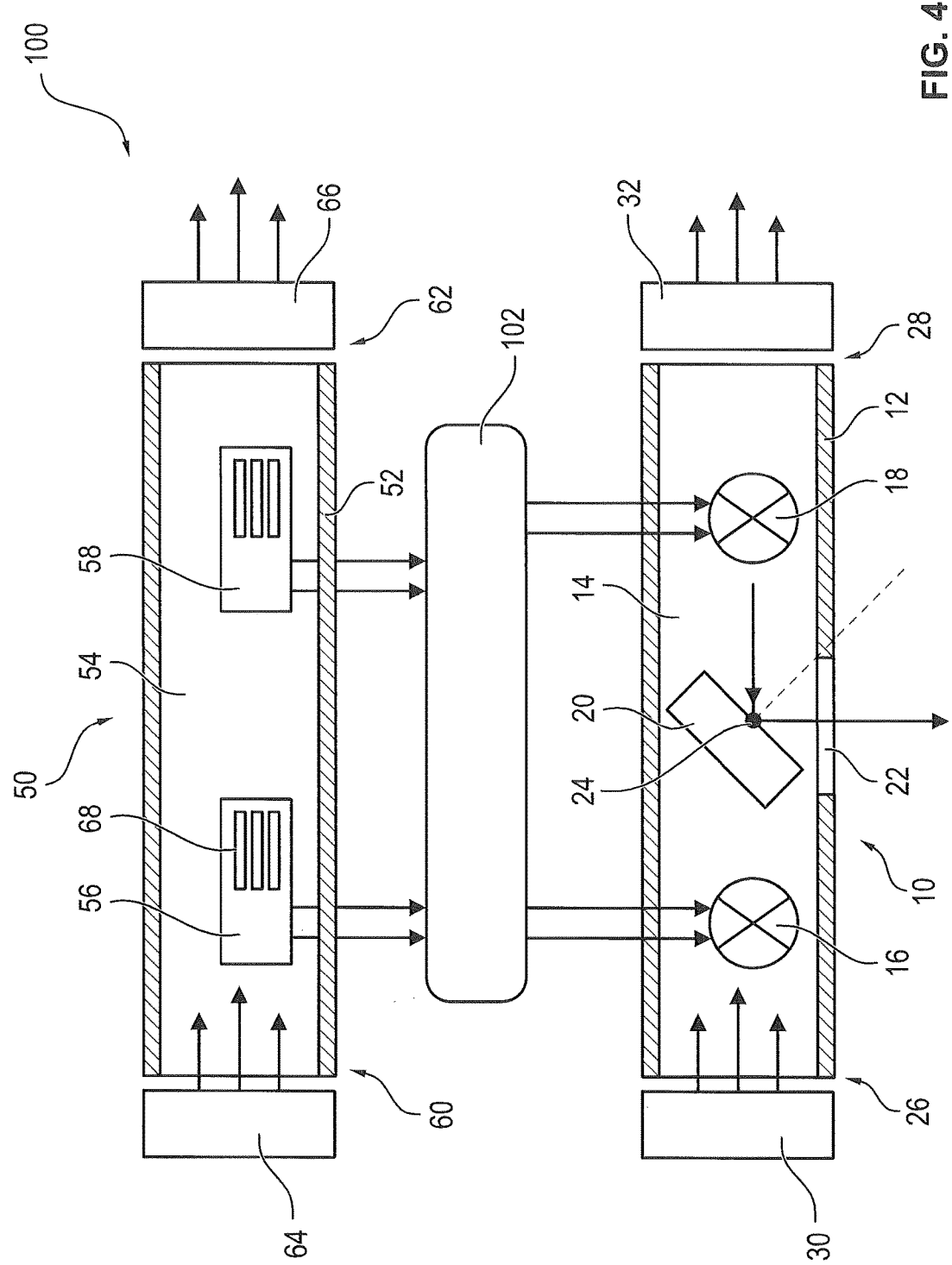

(51) Int. Cl.
- *F21V 14/04* (2006.01)
- *F21V 5/02* (2006.01)
- *F21V 7/00* (2006.01)
- *F21V 19/04* (2006.01)
- *F21V 29/67* (2015.01)
- *G02B 21/06* (2006.01)
- *G02B 21/28* (2006.01)
- *G02B 23/24* (2006.01)
- *F21V 29/503* (2015.01)
- *F21V 29/508* (2015.01)
- *F21W 131/20* (2006.01)

(52) U.S. Cl.
CPC ............. *F21V 23/02* (2013.01); *F21V 23/04* (2013.01); *F21V 29/503* (2015.01); *F21V 29/508* (2015.01); *F21V 29/67* (2015.01); *G02B 21/06* (2013.01); *G02B 21/28* (2013.01); *G02B 23/2461* (2013.01); *F21W 2131/20* (2013.01)

(56) References Cited

U.S. PATENT DOCUMENTS

| | | | | |
|---|---|---|---|---|
| 2011/0181842 A1* | 7/2011 | Kanno | | G03B 21/16 353/52 |
| 2011/0292649 A1* | 12/2011 | Yamagishi | | H04N 9/3164 362/232 |
| 2013/0250250 A1* | 9/2013 | Lin | | G03B 21/16 353/57 |
| 2014/0152959 A1* | 6/2014 | Kuster | | G02B 21/10 351/221 |
| 2016/0377252 A1* | 12/2016 | Bhakta | | F21V 29/77 362/520 |

FOREIGN PATENT DOCUMENTS

| | | |
|---|---|---|
| DE | 4231469 | 3/1994 |
| DE | 19846724 | 4/1999 |
| DE | 102004051940 | 4/2006 |
| DE | 202008000360 | 5/2008 |
| DE | 102009019226 | 11/2010 |
| DE | 102004064115 | 2/2014 |
| JP | 2001244676 A | 9/2001 |
| JP | 2003324292 A | 11/2003 |
| JP | 3099741 U | 4/2004 |
| JP | 2005057119 | 3/2005 |
| JP | 2005221762 A | 8/2005 |
| JP | 2009053225 A | 3/2009 |
| JP | 2011132825 A | 7/2011 |
| JP | 2011154855 A | 8/2011 |
| JP | 2012003257 A | 1/2012 |
| WO | 2013146746 A | 10/2013 |

* cited by examiner

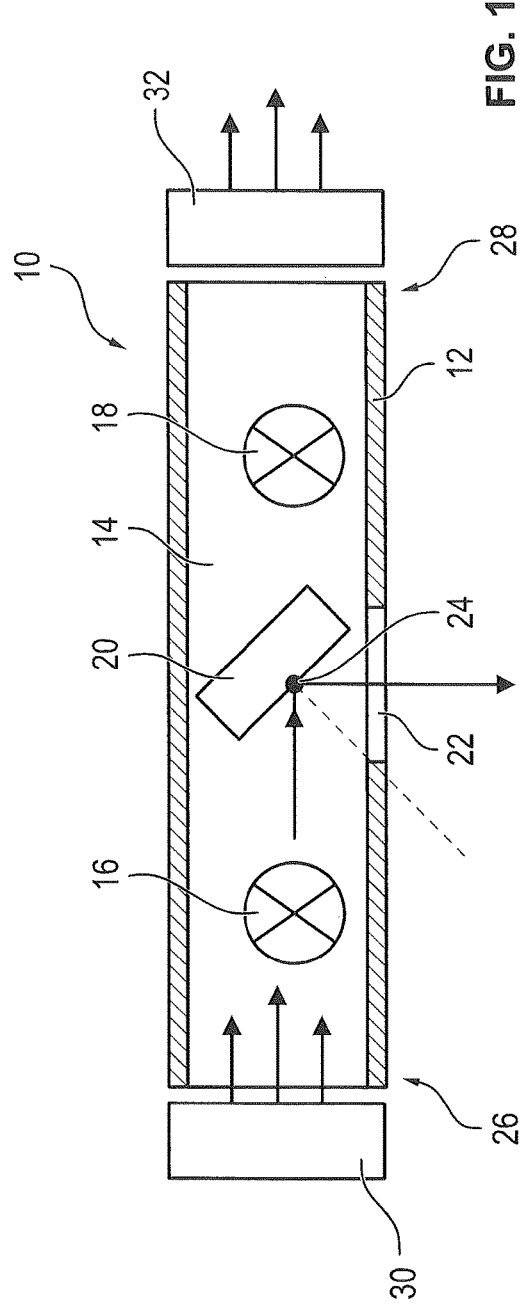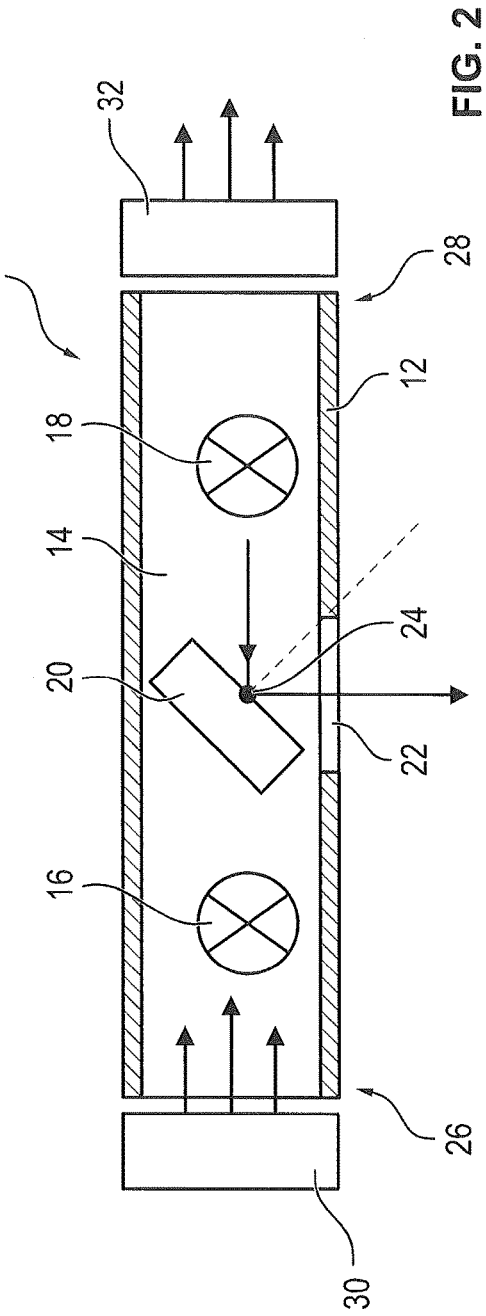

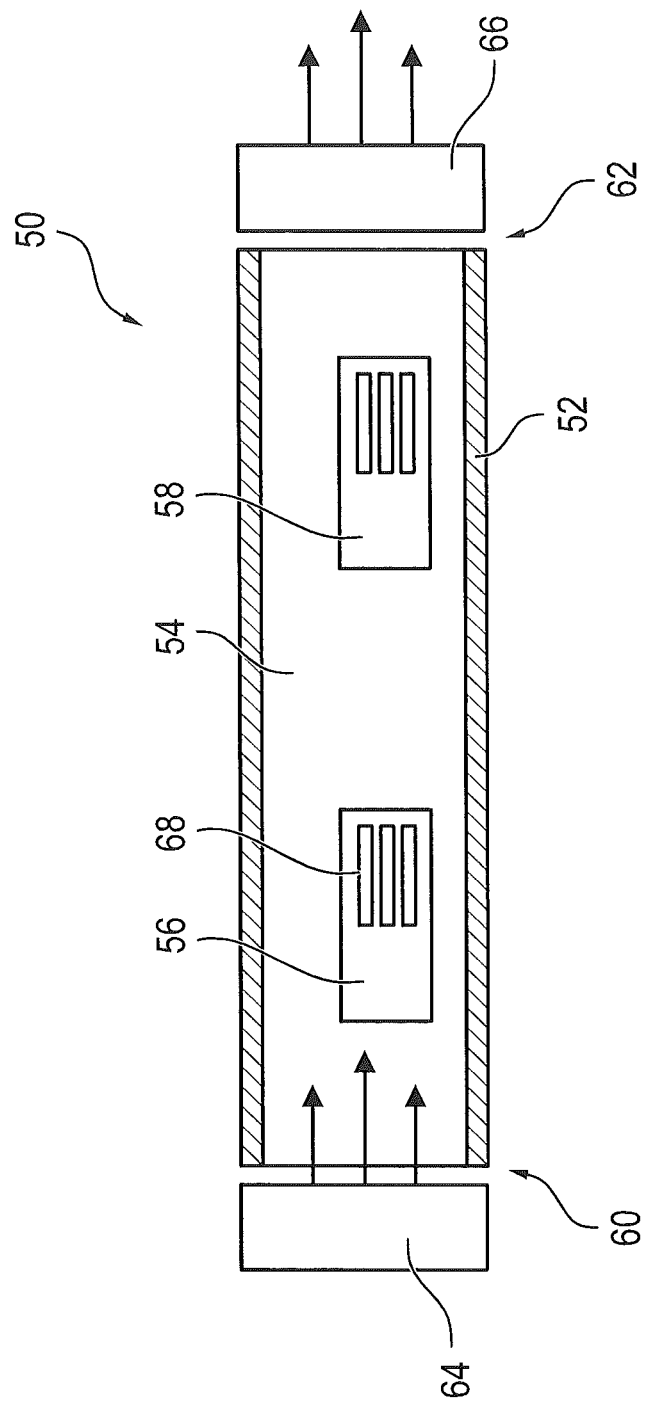

ILLUMINATION UNIT FOR MEDICAL DEVICES, AND ENERGY SUPPLY UNIT FOR SUPPLYING THE ILLUMINATION UNIT WITH ELECTRICAL ENERGY

FIELD OF THE INVENTION

The invention relates to an illumination unit, and to an energy supply unit for supplying the illumination unit with electrical energy. The invention further relates to an illumination system made up of such an illumination unit and such an energy supply unit. The illumination system is used in particular in medical devices.

BACKGROUND OF THE INVENTION

Fail-safe performance of devices plays a large role in medical technology; for example because during a surgical procedure, it cannot be interrupted simply because a medical device fails. Partially redundant illumination systems are therefore known in which multiple light sources are provided, such that upon failure of one light source it is possible to switch over to another light source. This is as a rule accompanied by a change in the beam path of the light, with the result that the light intensity also changes and the perception of the illuminated region can thus be different. Also known, alternatively, are illumination systems in which partial redundancy is achieved by the fact that a substitute light source can be swung in in place of another light source.

These partially redundant illumination systems are disadvantageous in that fail-safe performance is ensured only upon failure of the light source itself. On the other hand, in the event of failure of other modules of the illumination system that are essential for operation of the illumination system, for example the light source cooling system and/or the power supply system, the illumination system cannot continue to operate.

To solve this problem, illumination systems are known in which two entirely separate illumination units are provided, i.e. not only are two or more light sources provided, but all the other units are also provided in duplicate. Here each light source and the other associated elements constitute a respective autonomous unit. Such illumination units are disadvantageous in that they are of very complex construction and also function only as long as all the elements within one of these autonomous units are functional. For example, if the light source fails inside one unit, and the cooling system in the other unit, this illumination system as well can no longer be used.

Partially autonomous illumination systems of this kind are known, for example, from the documents DE 10 2004 051 940 A1, DE 4231469 A1 and DE 4104609 A1.

SUMMARY OF THE INVENTION

An object of the invention is to describe an illumination unit, and an energy supply unit for supplying the illumination unit with electrical energy, which ensure a high level of fail-safe performance and in particular full redundancy.

This object is achieved by an illumination unit having the features of claim 1, and by an energy supply unit having the features of the further independent claim. Advantageous refinements of the invention are described in the dependent claims.

According to the present invention the illumination unit encompasses a channel in which a first and a second light source are received, these two light sources being arranged one behind another in the channel. A first cooling unit for cooling the first and the second light source is arranged at a first end of the channel, and a second cooling unit for cooling the first and the second light source is arranged at a second end, located opposite the first end, of the channel. Also provided in the channel is a light exit opening, there being arranged in the channel a displaceable reflection element with the aid of which, depending on the position of the reflection element, light radiated selectably from the first or the second light source is directed through the light exit opening in order to illuminate an illumination region.

Arrangement of the light sources "one behind another" in the channel is understood to mean in particular that the two light sources are arranged serially, i.e. that the two light sources are arranged one behind another with respect to the longitudinal axis of the channel.

The displaceable reflection element ensures that upon failure of one of the two light sources, light from the other light sources can be used for illumination thanks to corresponding displacement of the reflection element.

The arrangement of the two light sources one behind another in a channel at each of whose ends a cooling unit is provided offers the advantage that upon failure of one of the two cooling units, both light sources can be cooled via the other cooling unit.

What is achieved all in all is thus a fully redundant illumination unit, i.e. such that both upon failure of a light source and upon failure of a cooling unit, the illumination unit can continue to be operated. The arrangement described above has the advantage in particular that no association occurs between the cooling units and the light sources, so that no self-contained independent sub-units are constituted but instead the best possible fail-safe performance is achieved.

The first and the second cooling unit are in particular constituted identically, so that a particularly simple configuration is achieved. Parts count is furthermore thereby reduced, so that costs are minimized and assembly errors are precluded.

The first and/or the second cooling unit preferably each encompass a fan. In particular, the two cooling units each have several fans. Reliable, dependable cooling can thereby be produced in simple fashion.

It is furthermore advantageous if, in a regular operating state, the fans of both cooling units are operated at a first rotation speed. Upon failure of one of the fans, the fan or fans of the other cooling unit is or are operated at a second rotation speed, the second rotation speed being higher than the first rotation speed. Preferably the second rotation speed is twice as high as the first rotation speed.

The cooling flows generated by the two cooling units are, in particular, directed in the same direction, so that they sum with one another and together contribute to optimum cooling of the two cooling units.

It is particularly advantageous if the two cooling units are designed in such a way that any one of the two light sources is sufficiently coolable with the aid of only one cooling unit. "Sufficient cooling" is understood here in particular to mean that the light source can be cooled at least to the extent that it has a constant temperature during operation and thus suffers no damage. What is achieved thereby is that even upon a complete failure of one cooling unit, the activated light source can be cooled by the other cooling unit. Because no association exists between the cooling units and the light sources, regardless of which of the two light sources is being operated it can be cooled in the event of failure of a cooling unit, so that even upon failure of one light source, the other can always be used.

It is furthermore advantageous if, in a regular operating state, only one of the light sources but both cooling units are activated. What is achieved by operating both cooling units is that they each need to provide less cooling output, and in the case where fans are used are thus as quiet as possible. In particular, the rotation speeds of the individual fans of the two cooling units are adapted in such a way that minimum noise emission occurs.

The illumination unit comprises, in particular, a housing by which the channel is formed. The light exit opening is embodied in particular as a light-transmitting location within said housing. The light exit opening is arranged, in particular, centeredly between the two light sources.

It is furthermore advantageous if the reflection element encompasses a mirror and/or a prism, with the result that a reliably functioning reflection element of particularly simple configuration is obtained. The reflection element is, in particular, pivotable between a first position in which it directs light from the first light source through the light exit opening, and a second position in which it directs light from the second light source through the light exit opening. The light source being used can thus be switched over by simply pivoting the reflection element. Pivoting can be accomplished, selectably, both manually and automatically, i.e. mechanically.

The reflection element is, in particular, arranged centeredly between the two light sources, being thus at the same distance from both light sources so that upon switchover from one light source to the other light source, the light emitted from the light exit opening has the same light intensity. In particular, in both the first and the second position of the reflection element, the respective deflected light beams of the first and the second light source have the same focal point.

The light sources are, in particular, embodied identically. The light sources are, in particular, lamps.

A further aspect of the invention relates to an energy supply unit for supplying an illumination unit with electrical energy. The illumination unit is, in particular, one of the illumination units described previously.

The energy supply unit encompasses a channel in which a first and a second energy source for supplying the light sources of the illumination unit with electrical energy are arranged, these two energy sources being arranged one behind another in the channel. A first cooling unit for cooling the first and the second light source is arranged at a first end of the channel, and a second cooling unit for cooling the first and the second light source is arranged at a second end of the channel.

An arrangement "one behind another" is understood in particular to mean that the energy sources are arranged serially, i.e. that they are arranged one behind another with respect to a longitudinal axis of the channel.

What is achieved by the configuration described above is once again full redundancy. Because both light sources can be supplied with electrical energy via both energy sources, the necessary energy can be applied even upon failure of one energy source. A further result of providing two cooling units at the ends of the channel, and of the serial arrangement of the energy sources inside the channel, is that even upon failure of one cooling unit the respectively operated energy source can be cooled regardless of whether it is the first or the second energy source. Here as well, in particular, there is thus no association of cooling units with energy sources, and also no association of energy sources with light sources, so that in the context of any combination of failures of individual elements, the system can be operated as long as at least one element of each type of element is still functional.

Here as well, the first and/or the second cooling unit each encompass preferably one, in particular several fans, so that a particularly simple, effective configuration is achieved.

The two cooling units are, in particular, embodied identically.

Furthermore, the two cooling units are preferably embodied in such a way that the cooling flows generated by them are directed in the same direction, so that the cooling outputs are summed and thus a lower cooling output needs to be furnished by each cooling unit.

The cooling units are preferably designed in such a way that any one of the two energy sources is sufficiently coolable with the aid of only one cooling unit. What is achieved thereby is that the energy supply unit can continue to be operated in the context of complete failure of one of the two cooling units, regardless of which of the two energy sources of the energy supply unit is being operated.

In a regular operating state, in particular only one of the energy sources, but both cooling units, are activated, so that the respective cooling output to be applied by the cooling units is reduced.

The energy supply unit comprises in particular a housing by which the channel is formed.

In a particularly preferred embodiment both the first and the second energy source each encompass a transformer with which, in particular, a voltage conversion is accomplished.

It is furthermore advantageous if the first and the second energy source are embodied identically, so that upon failure of one of the energy source, switchover to the other energy source produces no changes in the performance of the system.

The first and/or the second energy source preferably each have cooling ribs, arranged at a distance from one another, with which effective cooling of the energy source is possible. Arranging the cooling ribs at a distance from one another results in the formation of a respective gap between the cooling ribs, through which cooling air can be guided. The cooling ribs are arranged in such a way that a cooling flow generated by the cooling units is passed through between the cooling ribs, so that the cooling flow can proceed through the cooling ribs with at little disruption as possible and effective cooling is thus enabled.

It is furthermore advantageous if the energy supply unit is provided with a shared output connector for the output of electrical energy to the illumination unit both from the first and from the second energy source. What is achieved thereby is that no association of the energy sources and the light sources of the illumination unit occurs, but instead both light sources can selectably be supplied with electrical energy via both energy sources. This once again ensures full redundancy.

It is furthermore advantageous if the first and/or the second cooling unit of the energy supply unit each encompass a fan, preferably several fans each, and if in a regular operating state the fans of both cooling units are operated at a first rotation speed. Upon failure of one of the cooling units, the fan or fans of the other cooling unit is or are operated at a second rotation speed, the second rotation speed being higher than the first rotation speed. Preferably the second rotation speed is twice as high as the first rotation speed.

A further aspect of the invention relates, to an illumination system that encompasses a previously described illumination unit as well as a previously described energy supply unit, the energy supply unit being connected to the illumination system in order to supply the illumination system with electrical energy.

The illumination unit and the energy supply unit are, in particular, connected to one another in such a way that the two light sources can be supplied with electrical energy unassociatedly via the two energy sources.

"Unassociatedly" is understood in particular to mean that each light source can be supplied with the necessary electrical energy selectably via both energy sources. The result achieved thereby is not only full redundancy of the energy supply unit and full redundancy of the illumination unit individually, but also full redundancy of the illumination system constituted by these two units.

What is achieved thereby in particular is that even upon a simultaneous failure of an energy source, of a cooling unit of the energy supply unit, of a light source, and of a cooling unit of the illumination unit, the illumination system remains entirely functional regardless of which of the units, respectively provided in duplicate, is respectively involved. Full redundancy, and thus the greatest possible fail-safe performance, are thereby achieved with the fewest possible units and with a very simple configuration.

The illumination unit and the energy supply unit are in particular connected to one another via a switching apparatus, the electrical energy delivered both from the first and from the second energy source being conveyable via the switching apparatus both to the first and to the second light source. The switching apparatus is in particular a switching plate.

BRIEF DESCRIPTION OF THE DRAWING VIEWS

Further features and advantages of the invention are evident from the description below, which explains the invention further with reference to exemplifying embodiments in conjunction with the appended drawings, in which:

FIG. 1 schematically depicts an illumination unit in a first operating state;

FIG. 2 schematically depicts the illumination unit according to FIG. 1 in a second operating state;

FIG. 3 schematically depicts an energy supply unit for supplying the illumination unit according to FIGS. 1 and 2 with electrical energy; and FIG. 4 schematically depicts an illumination system having an illumination unit according to FIGS. 1 and 2 and an energy supply unit according to FIG. 3.

DETAILED DESCRIPTION OF THE INVENTION

FIG. 1 schematically depicts an illumination unit 10 in a first operating state. FIG. 2 shows illumination unit 10 according to FIG. 1 in a second operating state.

Illumination unit 10 encompasses a housing 12 by which a channel 14 is formed. A first light source 16, a second light source 18, and a reflection element 20 are arranged inside channel 14. The two light sources 16, 18 are arranged one behind another with respect to the longitudinal axis of channel 14, and are thus arranged serially.

Reflection element 20 is embodied in such a way that with its aid, light radiated from light sources 16, 18 can be directed through a light exit opening 22 of housing 12. Reflection element 20 comprises for this, in particular, a mirror and/or a prism, and is arranged rotatably around an axis 24. In the first operating state with reflection element 20 in the first position shown in FIG. 1, reflection element 20 is arranged in such a way that light emitted from first light source 16 is directed through light exit opening 22. In the second position shown in FIG. 2, conversely, reflection element 20 is pivoted into a second position such that light emitted from second light source 18 is directed through light exit opening 22.

The switchover of reflection element 20 between the first and the second position can be accomplished both manually and automatically.

The result of providing two light sources 16, 18 and reflection element 20 is that upon failure of one of the two light sources 16, 18, it is possible to switch over to the other light source 16, 18 by corresponding displacement of reflection element 20, so that light radiated from the other light source 16, 18 is then emitted through outlet opening 22. In particular, the only light source 16, 18 activated is always the one from which light through light exit opening 22 is presently needed in order for light to be emitted from illumination unit 10.

The two light sources 16, 18 are embodied in particular in the form of identical lamps and are at the same distance from rotation axis 24 of reflection element 20, so that reflection element 20 is arranged centeredly between the two light sources 16, 18, and therefore regardless of the light source 16, 18 from which light is presently being emitted via light exit opening 22, the emitted light has the same light intensity and focal point because the light path is also the same. The emitted light output of illumination unit 10 is thus not modified upon switchover between the two light sources 16, 18, so that the same illumination occurs regardless of which light source 16, 18 is being operated.

A first cooling unit 30 is arranged at a first end 26 of channel 14. A second cooling unit 32 is arranged at second end 28, opposite from first end 26, of channel 14, both cooling units 30, 32 serving to cool light sources 16, 18. In particular, both cooling units 30, 32 are embodied in such a way that even upon failure of one of the two cooling units 30, 32, the remaining cooling output is enough for sufficient cooling of one of the two light sources 16, 18, namely the respective light source 16, 18 being operated.

The result of providing two cooling units 30, 32 at the two ends is that both light sources 16, 18 can be cooled via both cooling units 30; 32, so that full redundancy is achieved, since upon failure of one cooling unit 30, 32 and one light source 16, 18, full functionality of illumination unit 10 is still ensured regardless of which cooling unit 30, 32 and which light source 16, 18 fails.

Cooling units 30, 32 preferably each comprise multiple fans, the rotation speeds of the fans of the two cooling units 30, 32 being coordinated with one another in such a way that noise emissions are minimized. In particular, both cooling units 30, 32 are in operation in the normal operating mode, i.e. in the operating mode in which neither of cooling units 30, 32 has failed, so that the cooling output to be provided respectively by the cooling units 30, 32 is minimized and operation is thus as quiet as possible.

FIG. 3 schematically depicts an energy supply unit 50 for supplying illumination unit 10 according to FIGS. 1 and 2 with electrical energy.

Energy supply unit 50 comprises a housing 52 by which a channel 54 is formed. Two energy sources 56, 58 are arranged one behind another inside channel 54, the two energy sources 56, 58 serving to supply light sources 16, 18 of illumination unit 10 with electrical energy. The two energy sources 56, 58 are arranged serially, i.e. they are arranged one behind another with respect to the longitudinal axis of channel 54.

The two energy sources 56, 58 are, in particular, embodied identically and preferably each comprise a transformer by which an input voltage is transformed into a corresponding output voltage in accordance with the voltage required by light sources 16, 18.

A first cooling unit 64 is arranged at a first end 60 of channel 54. A second cooling unit 66 is arranged at a second end 62, opposite from first end 60, of channel 54, the two cooling units 64, 66 being in particular embodied identically.

It is particularly advantageous if the two cooling units 64, 66 of energy supply unit 50 are embodied identically to the two cooling units 30, 32 of illumination unit 10, so that the necessary parts count is minimized.

The two cooling units 64, 66 of energy supply unit 50 each comprise in particular multiple fans with which a cooling flow through channel 54 can be generated. Cooling units 64, 66 are embodied in such a way that the two cooling flows have the same direction, so that the outputs of the two cooling units 64, 66 in the region of channel 54 are summed.

In particular, the two cooling units 64, 66 are dimensioned so that each cooling unit 64, 66 is individually sufficient for sufficient cooling of at least one of the two energy sources 56, 58. "Sufficient cooling" is understood to mean that the cooling is at least of such a magnitude that the respective energy source 56, 58 heats up only within a tolerable predetermined range, and no damage to energy sources 56, 58 thus occurs.

Energy sources 56, 58 preferably each comprise several cooling ribs, one of which, for energy source 56, is labeled by way of example with the reference character 68.

Cooling ribs 68 are arranged at a predetermined distance from one another, and are aligned so that the cooling flow generated by cooling units 64, 66 can pass through cooling ribs 68 so that optimum heat transfer from cooling ribs 68 to the cooling flow is possible.

The two energy sources 56, 58 are dimensioned in such a way that a light source 16, 18 can be supplied with sufficient electrical energy via each energy source 56, 58. Even upon failure of one of the two energy sources 56, 58, that light source 16, 18 of illumination unit 10 which is being operated can thus be supplied with electrical energy, so that complete redundancy is achieved.

Complete redundancy is likewise achieved thanks to the provision of the two cooling units 64, 66 at the ends of channel 54 of energy supply unit 50, since upon failure of one of the two cooling units 64, 66, energy source 56, 58 that is respectively being operated can be sufficiently cooled by the non-failed cooling unit 64, 66. Here as well, in particular, no association of cooling units 64, 66 with energy sources 56, 58 occurs, so that the functionality of energy supply unit 50 is still ensured even upon failure of one energy source 56, 58 and one cooling unit 64, 66.

FIG. 4 schematically depicts an illumination system 100 that encompasses an illumination unit 10 according to FIGS. 1 and 2 as well as an energy supply unit 50 according to FIG. 3. Energy supply unit 50 and illumination unit 10 are connected to one another here via a switching apparatus 102, in such a way that electrical energy can be transferred from energy supply unit 50 to illumination unit 10.

The interconnection via switching apparatus 102 is embodied in such a way that no association exists between energy sources 56, 58 and light sources 16, 18. This is understood in particular to mean that both first light source 16 and second light source 18 can be operated via first energy source 56. Similarly, both first light source 16 and second light source 18 can be supplied with electrical energy via second energy source 58.

What is achieved thereby is that illumination system 100 possesses complete redundancy and thus the best possible fail-safe performance is achieved, along with as few modules as possible and the simplest possible configuration. By avoiding associations among the individual modules it is possible in particular for illumination system 10 to remain fully functional, and for the required predetermined quantity of light to be able to emerge from light exit opening 22, even upon failure of one light source 16, 18, failure of one energy source 56, 58, failure of one of cooling units 30, 32 of illumination unit 10, and simultaneous failure of one cooling unit 64, 66 of energy supply unit 50.

Illumination system 10 is utilized in particular in medical devices. The result is that illumination system 10 continues to remain fully functional even upon failure of individual units during a procedure.

In particular, activation and deactivation of light sources 16, 18 and/or of energy sources 56, 58 can also be accomplished by way of switching apparatus 102. In particular, a switchover between light sources 16, 18 and energy sources 56, 58 can be carried out thereby in the event of failure respectively of a light source 16, 18 or of an energy source 56, 58. Switching apparatus 102 can moreover also serve to control the cooling output of cooling units 30, 32, 64, 66.

PARTS LIST

10 Illumination unit
12 Housing
14 Channel
16, 18 Light source
20 Reflection element
22 Light exit opening
24 Axis
26, 28 End
30, 32 Cooling unit
50 Energy supply unit
52 Housing
54 Channel
56, 58 Energy source
60, 62 End
64, 66 Cooling unit
68 Cooling rib
100 Illumination system
102 Switching apparatus

What is claimed is:

1. An illumination system comprising,
an illumination unit (10) comprising:
a light source channel (14) having a first end (26) and a second end (28) spaced from one another along a longitudinal axis of the light source channel (14), and a light exit opening (22);
a first and a second light source (16, 18) arranged one behind another in the light source channel (14), wherein the first light source (16) and the second light source (18) are aligned with one another along the longitudinal axis of the light source channel (14);
a first cooling unit (30), arranged at the first end (26) of the light source channel (14), for cooling the first and the second light source (16, 18);
a second cooling unit (32), arranged at the second end (28) of the light source channel (14), for cooling the first and the second light source (16, 18);

a displaceable reflection element (20) provided in the light source channel (14), wherein light radiated selectably from the first or the second light source (16, 18) is directed through the light exit opening (22) by the reflection element (20) depending on the position of the reflection element (20); and an energy supply unit (50) comprising:

an energy source channel (54) having a first end (60) and a second end (62);

a first and a second energy source (56, 58) for supplying the first and second light sources (16, 18) of the illumination unit (10) with electrical energy, the first and second energy sources (56, 58) being arranged one behind another in the energy source channel (54);

a third cooling unit (64), arranged at a first end (60) of the energy source channel (54), for cooling the first and the second energy sources (56, 58); and a fourth cooling unit (66), arranged at the second end (64) of the energy source channel (54), for cooling the first and the second energy sources (56, 58);

wherein the illumination unit and the energy supply unit are connected to one another via a switching apparatus; the switching apparatus being outside of the light source channel and the energy source channel.

2. The illumination system (100) according to claim 1, wherein the illumination unit (10) and the energy supply unit (50) are connected to one another such that the first and second light sources (16, 18) can be supplied with electrical energy unassociatedly via the first and second energy sources (56, 58).

3. The illumination system (100) according to claim 1, wherein the electrical energy delivered both from the first and from the second energy source (56, 58) being conveyable via the switching apparatus (102) both to the first and to the second light source (16, 18).

* * * * *